(No Model.)

F. J. PATTEN.

SYSTEM OF SYNCHRONIZING ELECTRIC MOTORS.

No. 397,817.

3 Sheets—Sheet 1.

Patented Feb. 12, 1889.

WITNESSES:

INVENTOR,
Francis James Patten (No Model.) 3 Sheets—Sheet 2.
F. J. PATTEN.
SYSTEM OF SYNCHRONIZING ELECTRIC MOTORS.
No. 397,817. Patented Feb. 12, 1889.
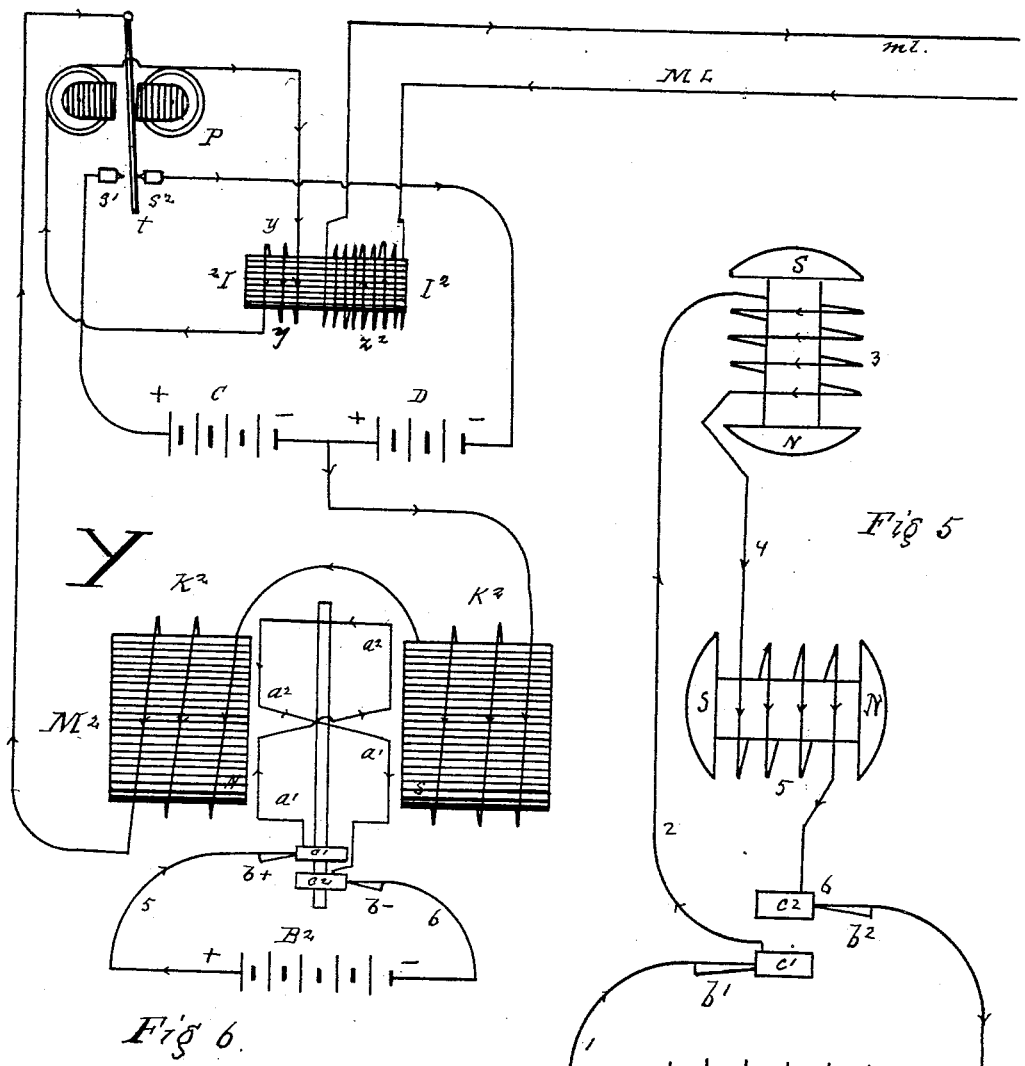
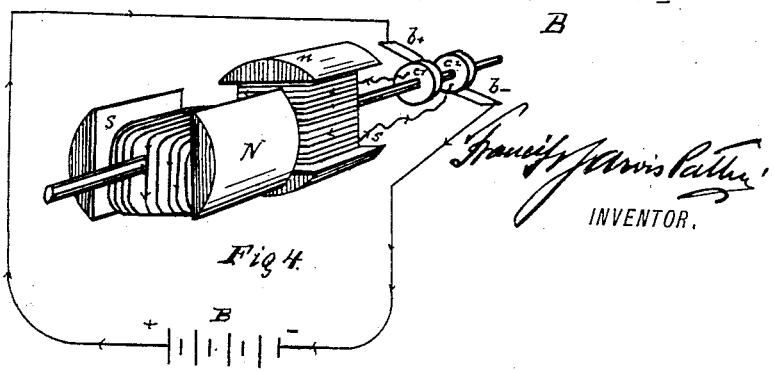
WITNESSES:
INVENTOR.

(No Model.) 3 Sheets—Sheet 3.
F. J. PATTEN.
SYSTEM OF SYNCHRONIZING ELECTRIC MOTORS.
No. 397,817. Patented Feb. 12, 1889.
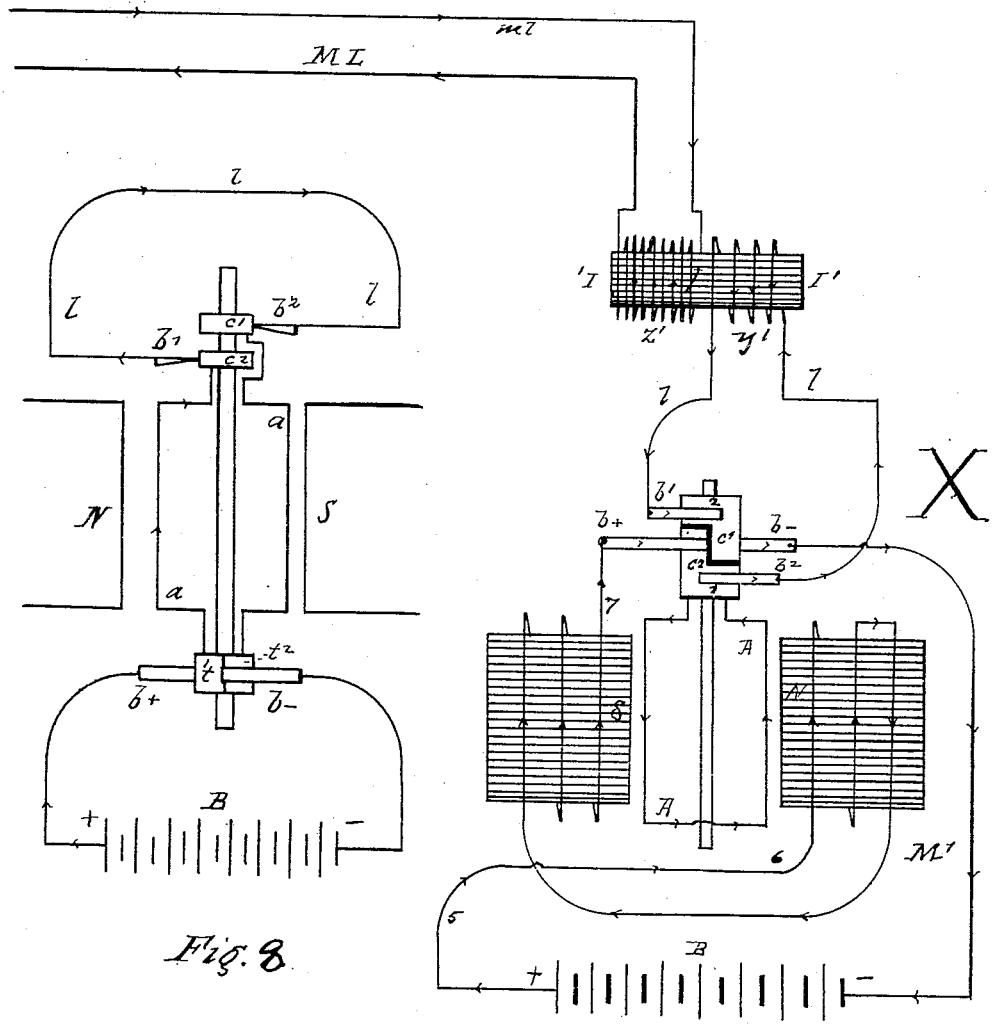
Fig. 8.
Fig. 7.
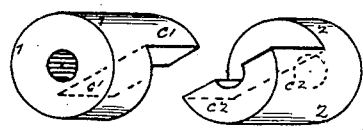
Fig. 9.
WITNESSES:
INVENTOR.

UNITED STATES PATENT OFFICE.

FRANCIS JARVIS PATTEN, OF NEW YORK, N. Y., ASSIGNOR TO J. M. SEYMOUR, OF SAME PLACE.

SYSTEM OF SYNCHRONIZING ELECTRIC MOTORS.

SPECIFICATION forming part of Letters Patent No. 397,817, dated February 12, 1889.

Application filed September 12, 1888. Serial No. 285,242. (No model.)

*To all whom it may concern:*

Be it known that I, FRANCIS JARVIS PATTEN, a citizen of the United States, residing at New York, in the county and State of New York, have invented a new and useful System of Synchronizing Electric Motors at Distant Points, of which the following is a specification.

This invention relates to a novel system of synchronizing electric motors, and has for its object to preserve in synchronous movement two or more operative parts at two or more points or stations, with a view to utilizing such synchronous motion for any purposes, telegraphic or otherwise, for which it may be available.

The invention embodies an application of the generic idea described in a former case filed by me, the difference residing in the use of induction-currents on the line in lieu of the battery-currents used in the prior case.

The present invention, in its broadest sense, consists in the use of induced or comparatively high tension currents on the line, said currents being used to produce simultaneous reversals of magnetism in one of the elements of the electric motors.

The invention more specifically embodies the reduction of tension in the induced currents before controlling the driven motor.

The invention also embodies other features relating to the system and the motors themselves, which will be more particularly hereinafter described, and definitely indicated in the claims accompanying this specification.

Figure 1:
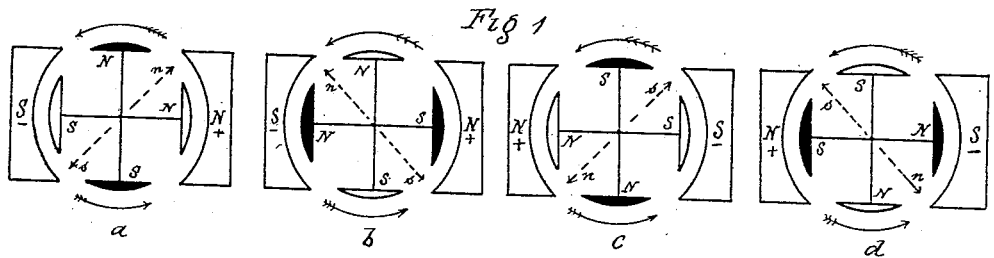
Figure 2:
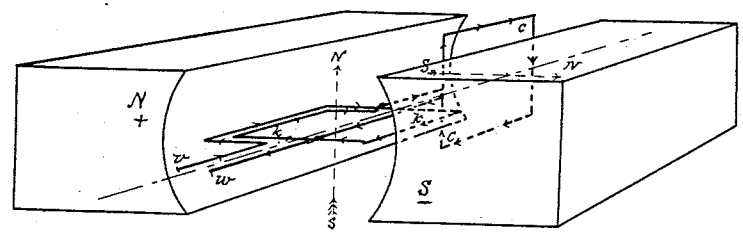
Figure 3:
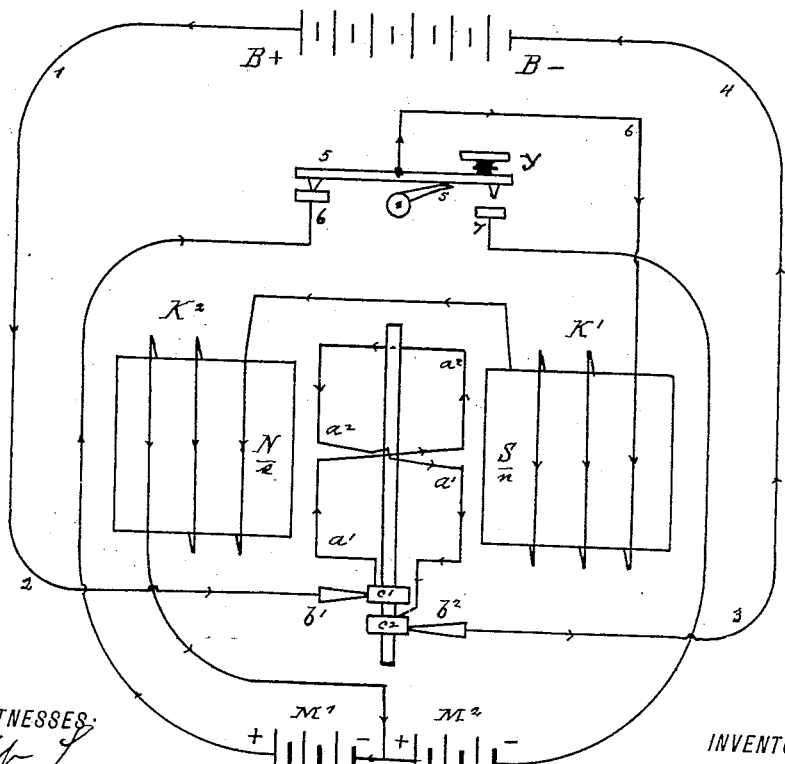

In the accompanying drawings, which illustrate the invention, Figures 1, 2, and 3 are diagrams illustrating the form and principle of action of the driven machine. Fig. 4 is a perspective view of the armature used in the driven machine. Fig. 5 illustrates the winding thereof and connections to brushes and source of current through them. Figs. 6 and 7 are diagrams showing the organization at two distant stations, X and Y, connected with each other by a line-circuit. Figs. 8 and 9 are details designed to show the difference between the controlling-machine as set forth in the present system and that shown in a former application.

A characteristic feature of the invention here described is the form and construction of the driven motor or machine which is required to move in unison with another. I have tried many forms of such machines and have referred to them in former applications.

The general system shown in Figs. 6 and 7 will be first described, and later the special construction of the driven machine.

At the station X, Fig. 7, is placed an electric motor of extremely simple form, consisting merely of a Siemens H or two-pole armature revolving in a two-pole magnetic field. A battery or other source of energy supplies the current which flows through the field-magnet coils from the plus terminal of the battery to the brush, thence through the armature-circuit A A, in which the current is reversed at each half-revolution of the armature by the action of the two-part commutator $c'$ $c^2$. This motor is an ordinary direct-current machine of the simplest form. It only differs from the ordinary forms in the construction of the commutator, the two parts being shown in perspective in Fig. 9. Each half of the commutator has a projecting end, which entirely encircles the armature-spindle shown at 1 and 2, Figs. 7 and 9. Against these parts, Fig. 7, the two extra brushes $b'$ and $b^2$ are caused to bear, and to these brushes a loop or shunt to the armature is secured which may be given any desired resistance. In former applications I have shown a split armature, as ilustrated in Fig. 8, the commutator $t'$ $t^2$ being of the ordinary form, but the armature $a$ $a$ being open at a middle point, and these midway terminals connected to rings $c'$ $c^2$, and through brushes bearing on the latter the armature-circuit is closed through the loop $l$ $l$. Either form is operative in the system. In one all the armature-current traverses the external loop. In the other the loop may be given any desired resistance, and being arranged as a shunt to the armature-circuit any required part of the current may be sent through it. In both cases, however, as will be seen from a consideration of the action of the commutator, an alternating current reversed accurately at each half-revolution of the armature will traverse the external circuit or loop circuit, $l\ l$, and this constitutes the important operative feature of the invention. Thus by operation of the peculiar form of commutator shown in Fig. 7 the current in the loop $l\ l$ is reversed at each half-revolution of the armature A A. This loop is wound as a primary around the core of an induction-coil, $I'\ I'$, the secondary of which, $z'$, is connected in the main-line circuit M L $m\ l$. This circuit extends to the distant station Y, Fig. 6, where it is again connected to the fine wire or secondary $z^2$ of the induction-coil $I^2\ I^2$ at station Y, which in this case is caused to act in reverse order, or as a converter reducing the high-potential currents coming from the distant station X to currents of low potential in the coils $y$ of the converter, which include between their terminals the polarized relay or vibrator P. The tongue of this relay $t$ is connected to the field-coils $K^2\ K^2$ of the motor $M^2$ at station Y, the other terminal being connected to the middle point of the split battery C D, and the opposite terminals of this battery are connected to the contact-stops $s'$ and $s^2$ of the polarized relay, from which it follows that as the tongue of the polarized relay $t$ is caused to vibrate back and forth reversed currents, or currents of reversed polarity, will be sent through the field-coils of the motor $M^2$ at station Y. The armature of this machine $M^2$ has its coils in series with each other, there being two, but not connected in any way to the field-coils. They have their terminals connected to two insulated rings, $c'$ and $c^2$, upon which the brushes $b+$ and $b-$ bear, and to these brushes the terminals of the direct-current battery $B^2$ are connected. The armature $a'\ a'\ a^2\ a^2$ is provided, therefore, with a continuous current of one direction, and under the given conditions it will revolve as later explained when reversed currents are sent through the field-coils, and this armature will perform exactly one-half a revolution at each successive reversal of the current in the field-coils. The system therefore operates as follows: The direct-current motor at station X, (designated as the controlling or governing motor,) is set in motion by merely turning on the current from any convenient source, B. As the armature of the motor revolves, it sends reversed currents through the coils $y'$ of the induction-coil $I'$, and these currents are reversed accurately at each half-revolution of the armature A A in the machine $M'$; but these rapid reversals induce corresponding periodic currents in the secondary $z'$ of the induction-coil, corresponding also in period to the half-revolutions of the armature. These latter currents are of high electro-motive force, and are propagated over the line to station Y, where in the converter $I^2$ they induce currents of greater strength and low electro-motive force in the coils $y\ y$ of the converter $I^2$. By reason of the position of the brushes $b+b-$ on the commutator, reversals in the loop $l\ l$ occur without breaks in the circuit, said brushes bridging the two segments of the commutator in the position of change. These currents operate the polarized relay or vibrator P, causing its tongue to vibrate rapidly back and forth, but in perfect unison with the half-revolutions of motor at the distant station X. As the tongue of the relay vibrates, however, it connects the field-coils $K^2\ K^2$ of the motor at Y first in one and then in the other half of the split battery C D, so that the current in the field-coils and the magnetic field of the motor $M^2$ at Y is reversed at each half-revolution of the motor at distant station X, and the armature $a'\ a^2$ of the motor at Y, when supplied with a direct current, completes exactly a half-revolution at each reversal of the field magnetism. The machine $M^2$ at Y runs in perfect synchronism with the distant governing-machine at X. Such is the system I have designed for causing two electric motors at distant points to move in unison, and it is superior to the ordinary unison movements, in that perfect synchronism is obtained without isochronism.

Most unison devices or synchronizing devices are based upon the idea that a machine can be made to run with absolute uniformity—*i. e.*, isochronously—being actuated by the vibrations of a tuning-fork or the oscillations of a pendulum, both of which motions when free and undisturbed are isochronous, but not necessarily so when maintained in motion by a constant application of power. Two identical isochronous machines would run necessarily in synchronism with each other, but not so unless perfectly isochronous themselves and having precisely the same rate of motion. In the system for synchronizing machines I have devised no such requirements are imposed. Indeed, the driving-machine at X may run at a very irregular pace, may even stop and start by jerks, speed up, or suddenly run slow.

The machine at distant station Y, constructed and connected as here described, follows all the motions of the governing-machine with perfect accuracy, going uniformly or by jerks in perfect synchronism with all the motions of the machine at X, except reversing, which is a peculiarity of the form of motor and is a decided advantage in such systems. This peculiarity resulting from the construction of the machine will now be explained.

It will be observed that the governing-machine at station X is an ordinary two-pole or Siemens H armature, while in the driven machine a four-pole or double armature is used, and placed in a single field. The four-pole armature goes in perfect synchronism with the distant two-pole armature; but its motion is steady and it will not reverse, while an ordinary two-pole armature in the driven machine connected in the same way will behave in the most erratic manner, reversing instantly at the highest speeds and stopping and starting apparently at will.

The four-pole armature in a two-pole or single field for the driven machine has many advantages and constitutes a prominent feature of the invention here described. I am well aware that a four-pole armature in a single field is not a new device in electric motors; but connected, as here shown, in a field the magnetism of which is automatically reversed by connections independent of the armature or a commutator I claim as a novel application of such devices.

It will be observed that the machine at station X is an ordinary continuous direct-current machine with the loop device and induction-coil attached, while the driven machine at Y is a peculiar form of direct-current motor. An analysis of its action during one single complete revolution of the armature will now be given, as shown in Figs. 4 and 6. The two coils $a'$ $a'$ and $a^2$ $a^2$ are wound continuously in series, and the terminals, instead of being connected to the segments of a commutator in the usual way, are secured each to an independent insulated ring-contact, $c'$ and $c^2$, Figs. 3, 4, 5, and 6, after the manner of an alternating-current machine; but the coils of the armature are supplied with a continuous current of one direction, and the poles N S and $n$ $s$, Fig. 4, maintain their polarity unchanged.

Reference to the four parts $a$ $b$ $c$ $d$ of Fig. 1 shows the action upon the armature in the four different quadrants of single revolution. The two poles of one armature-coil are, to avoid confusion, indicated in black in each different position, and the two of the other coil are left open and show white. Starting in the position shown at $a$, Fig. 1, and assuming that the field-poles have just changed to the polarity S− and N+ indicated, it will be seen that the effect of the two south poles S S of the armature is to produce a resultant south pole at $s$, and likewise the two north poles produce a resultant north pole at $n$, and motion ensues in the direction of the arrow. Passing on to the next quadrant, the resultant poles $n$ and $s$ are under the same attractions as before, and motion continues in the same direction. Passing to the next phase $c$, motion would be arrested were it not for the fact that now having completed a half-revolution the field-magnetism and field-poles are reversed, N+ on the left and S− on the right, so that now in this quadrant and in the next (shown at $d$) motion still continues in the direction of the arrow.

Fig. 2 is a diagram of the driven machine in perspective, one armature-coil being in a position of maximum action while the other is exerting zero effort. The resultant polarity of the armature is on a diagonal between the two, thus producing unstable equilibrium and a tendency to motion.

Fig. 3 is a diagram of the circuits in the motor-machine connected to operate through an ordinary telegraph-key or circuit-closer. The armature-coils $a'$ $a'$ $a^2$ $a^2$ are connected, through the rings $c'$ $c^2$ and brushes $b'$ $b^2$, to the source of direct current B+ B−. The field-coils have one terminal connected to the middle of the three-point key Y, and the other to the middle point of the divided battery M' M², the terminal poles of which are connected to the front and back stops, 6 and 7, of the key. A constant current of one direction is flowing in the armature from the source B+ B−; and if now the key Y is depressed, closing the contact at 7, the field-magnetism will suddenly be reversed and the armature will perform a half-revolution and suddenly stop. If the key be again raised and the contact 5 and 6 closed, it will turn another half-revolution and come to rest. If now the spindle of the machine is provided with a light fly-wheel and the key is vibrated rapidly back and forth, the armature will continue turning in the same direction, making a half-revolution at each reversal of the key.

In the system shown in Figs. 6 and 7 it is evident any other form of vibrator can be used in lieu of the polarized relay shown in Fig. 7, and in some instances the current from the induction-coil might be taken direct to the coils of the field, or the induced line-current carried through the relay P, Fig. 6, directly without the interposition of converter I². It is also evident that the main-line circuit M L $m$ $l$ shown, instead of being a two-line or complete metallic circuit, may be grounded at the stations X and Y when a single line-wire between stations would answer all purposes.

Having thus described my invention, what I claim, and desire to secure by Letters Patent, is the following—

1. A system for synchronizing electric motors comprising two or more motors at different stations, a line-circuit connecting the stations, a transformer having one of its circuits connected to line, a current-changer for periodically changing said current on line, and a pole-changer at a station periodically actuated by the line-currents, said pole-changer reversing the current in one of the elements of a driven motor, the other element of such motor being influenced by a current of constant direction.

2. In a system for synchronizing electric motors, the combination of the line-circuit carrying a periodically-changing current, a series of motors at different stations along said line-circuit, and an induction-transformer controlled by the line-currents, the induced circuit of said transformer controlling one of the magnetic elements of a driven motor and producing periodical reversals in said element corresponding to the changes in the line-current, the other element of said motor being excited by a current of constant direction.

3. In a system for synchronizing electric motors, the combination of the line-circuit carrying a periodically-changing current, a series of motors at different stations along said line-circuit, an induction-transformer having its induced circuit connected to the line, and a pole-changer controlled by the induced current of said transformer, one of the magnetic elements of each driven motor having its current reversed by the pole-changer, the other element of said motor being excited by a current of constant direction.

4. In a system for synchronizing electric motors, the combination of a line-circuit connecting different stations, an induction-coil having its induced circuit connected to the line, and its inducing-current periodically varied by a current-changer, and a series of electric motors at different stations having the current exciting one magnetic element reversed at periods corresponding to the changes in the line-current and the other element excited by a current of constant direction.

5. In a system for synchronizing electric motors, the combination of a line-circuit connecting different stations, an induction-coil having its induced circuit connected to the line, and its inducing-current periodically varied by a current-changer, a pole-changer controlled by the induced currents, and a driven motor or motors, each having the current exciting one of its magnetic elements reversed by the pole-changer at periods corresponding to the changes in the line-current and the other element excited by a current of constant direction.

6. In a system for synchronizing electric motors, the combination of a line-circuit connecting different stations, an induction-coil having its induced circuit connected to the line and its inducing-current periodically varied by a current-changer, an induction-transformer controlled by the line-current, a pole-changer operated by the induced currents of the transformer, and a driven motor or motors, each having the current exciting one of its magnetic elements reversed by the pole-changer at periods corresponding to the changes in the line-current and the other element excited by a current of constant direction.

7. A direct-current electric motor, in which the armature is provided with a reversing-commutator, to the segments of which continuous insulated ring-contacts are secured, brushes bearing on said segments connected in the motor-circuit, and independent brushes bearing on said rings connected to an external shunt-circuit to said armature, said shunt-circuit forming the primary of an induction-coil, the secondary of which is connected to an independent circuit.

8. An induction-coil having its primary circuit connected in a shunt-circuit around the armature-circuit of an electric motor, the secondary thereof constituting an independent circuit whereby alternating or pulsatory currents are caused to traverse said independent circuit, having the same period or rate of change as the reversals of current in the said armature-circuit.

9. In a synchronizing device for electric motors at different stations, a main-line circuit connected to the high-resistance circuit of induction-coils at the stations, the low-resistance circuit of one such coil being connected to the motor, the low-resistance circuit of the other to the coils of a polarized relay at its station, whereby said relay is caused to vibrate in unison with the reversals of current in the armature-circuit of said distant motor.

10. In a synchronizing system, an electric motor at one station provided with an ordinary two-pole armature and field-magnet, means for transmitting periodic pulsations in a line-circuit to a distant station, said pulsations corresponding in time to the half-revolutions of said motor-armature, a current-changer at said distant station controlled by said pulsations for reversing the field-magnetism of a motor at said distant station, a four-pole armature in said motor with two coils connected both to the same insulated continuous ring-contacts, and a source of direct current in circuit with said ring-contacts.

11. In a synchronizing system for electric motors, a controlling or governing motor, and a series of governed motors at distant stations having four-pole armatures excited by a continuous current of one direction and revolving in a single magnetic field the polarity of which is periodically reversed by changes in the line-circuit produced by the controlling-motor.

In testimony that I claim the foregoing as my invention I have hereunto set my hand, in the presence of two witnesses, this 11th day of September, 1888.

FRANCIS JARVIS PATTEN.

Witnesses:
ADOLPH KIENDL,
J. M. SEYMOUR.